United States Patent [19]

Swartz

[11] 3,964,433

[45] June 22, 1976

[54] LOAF MOLD WASHING AND RELEASE AGENT APPLYING MECHANISMS

[75] Inventor: Robert L. Swartz, Madison, Wis.

[73] Assignee: Oscar Mayer & Co. Inc., Madison, Wis.

[22] Filed: Mar. 11, 1975

[21] Appl. No.: 557,309

[52] U.S. Cl. ............................... 118/314; 118/317
[51] Int. Cl.² ...................... B05B 7/08; B05C 7/08
[58] Field of Search .......... 118/306, 314, 315, 317, 118/323; 134/61

[56] References Cited
UNITED STATES PATENTS

| | | | |
|---|---|---|---|
| 2,383,023 | 8/1945 | Sykes et al. | 118/314 |
| 2,529,291 | 11/1950 | Granam | 118/314 |
| 2,715,385 | 8/1955 | Yates | 118/306 |
| 3,544,355 | 12/1970 | Ott | 118/317 |
| 3,556,049 | 1/1971 | Hidden et al. | 118/317 |

*Primary Examiner*—Louis K. Rimrodt
*Attorney, Agent, or Firm*—Lockwood, Dewey, Zickert & Alex

[57] ABSTRACT

Washing and release agent application mechanisms, including a structure defining a chamber into which a magazine of loaf molds may be driven for treating the surface of the molds, wherein the structure includes doors opening for permitting the ingress and egress of a magazine in the chamber and the mechanism includes fluid distributing nozzles on wands for entry within the molds and treating the interior surfaces thereof. The mold washing mechanism also includes a U-shaped header which traverses the outsides of the molds for washing the outside surfaces.

13 Claims, 13 Drawing Figures

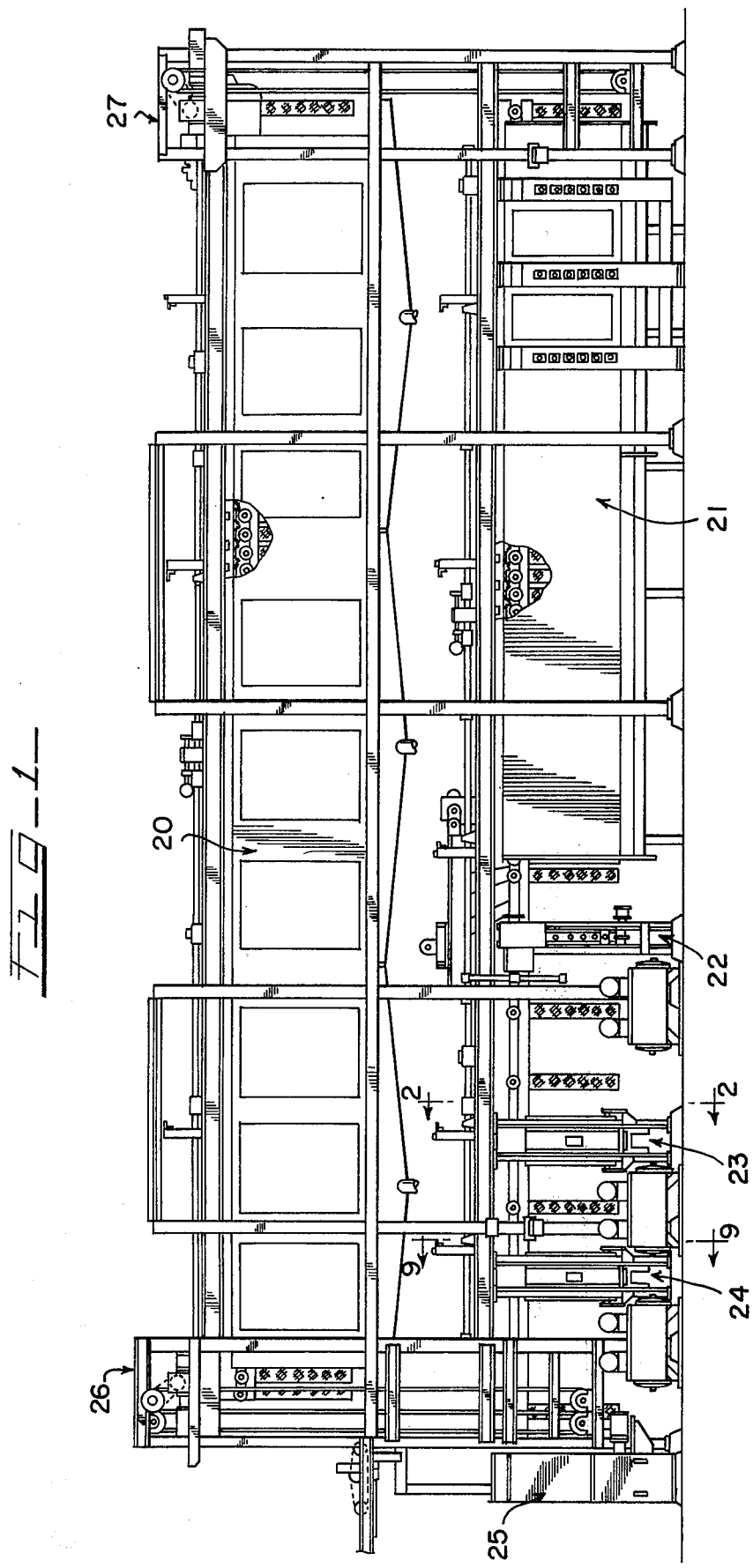

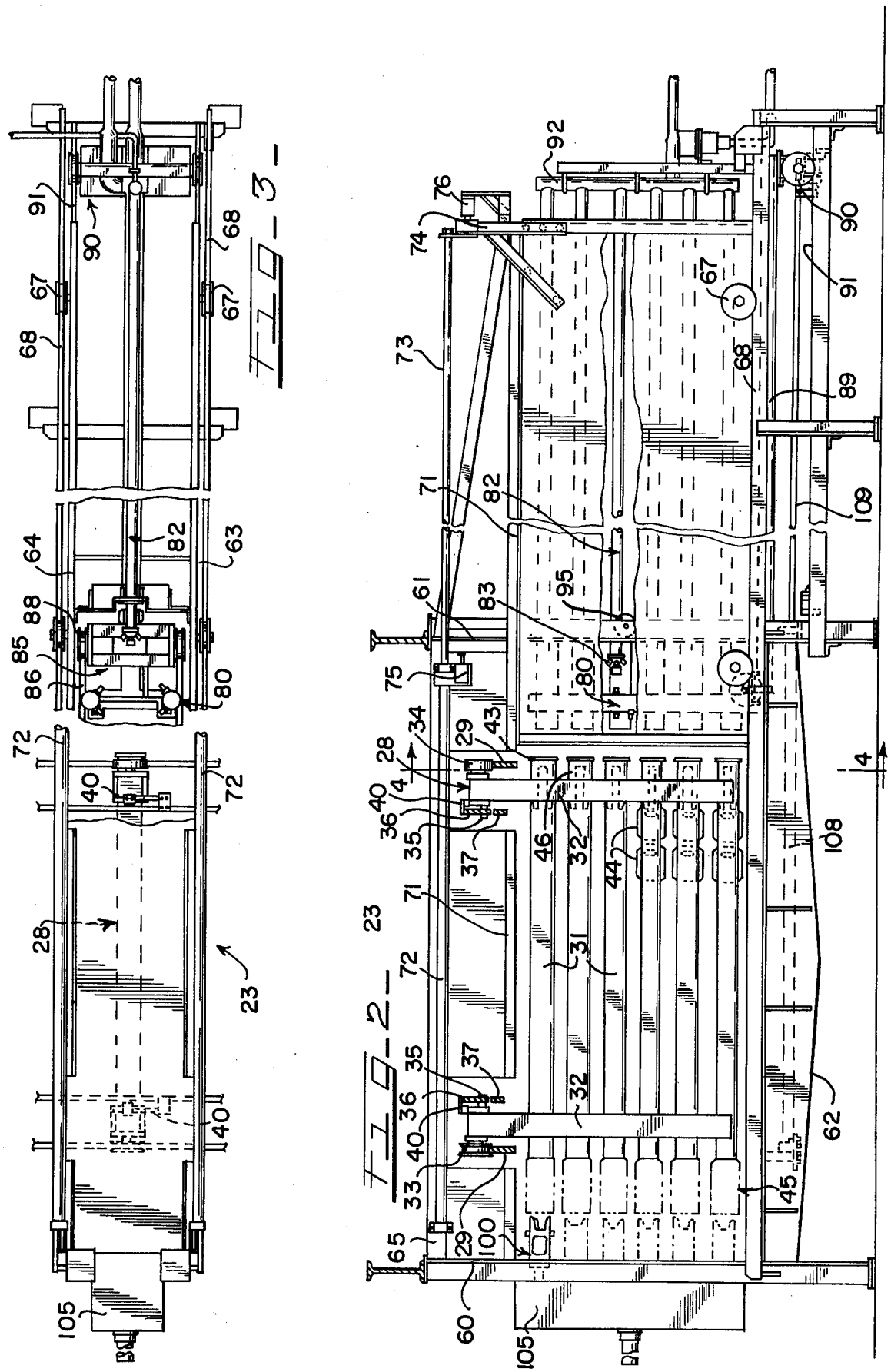

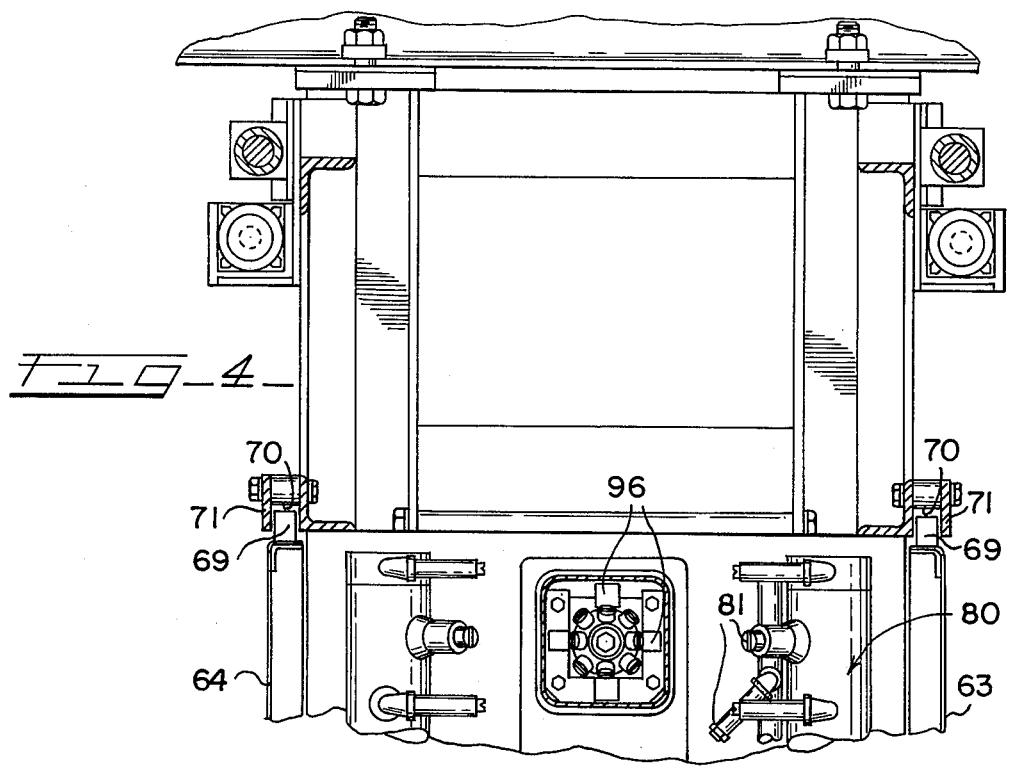
Fig. 4
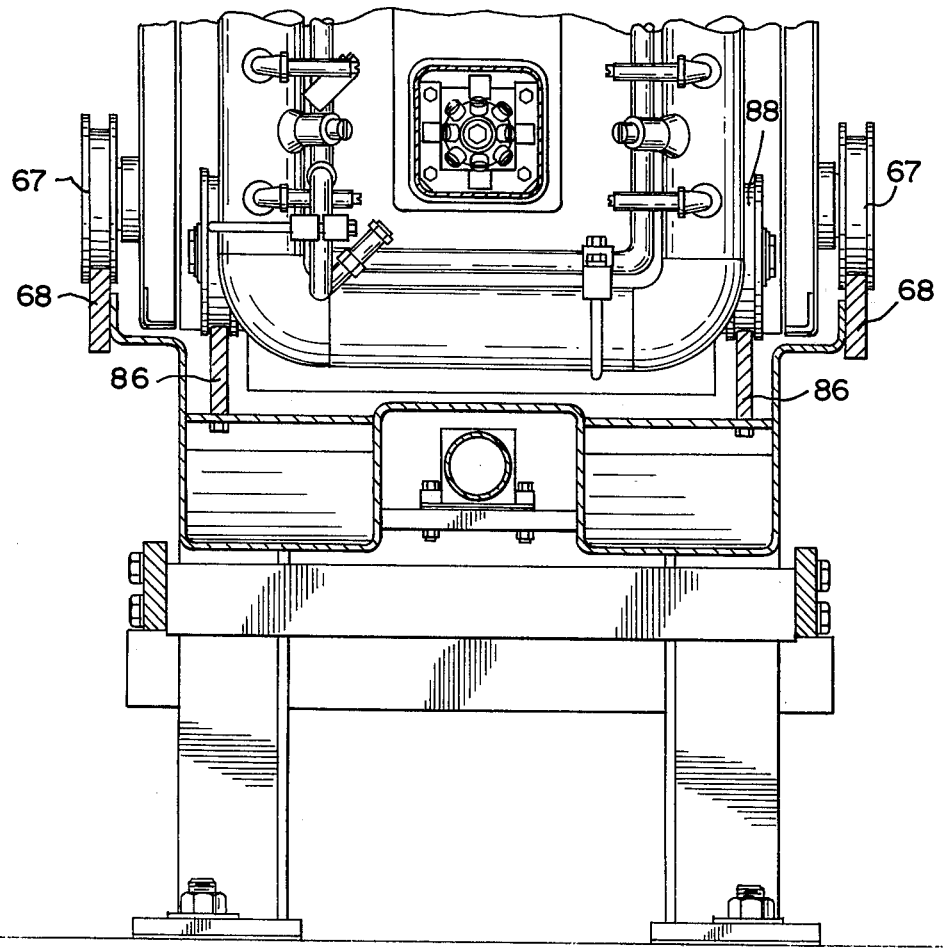

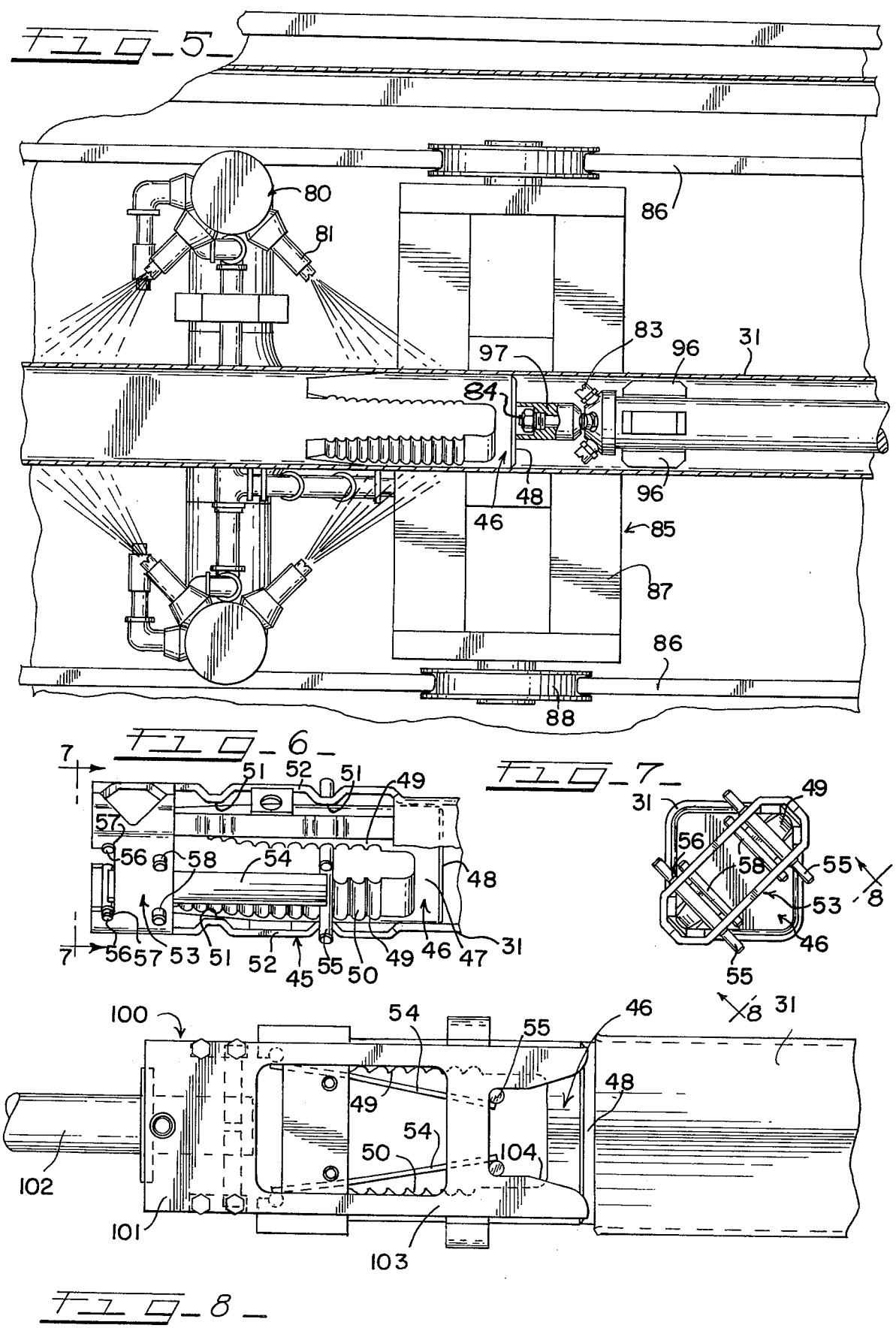

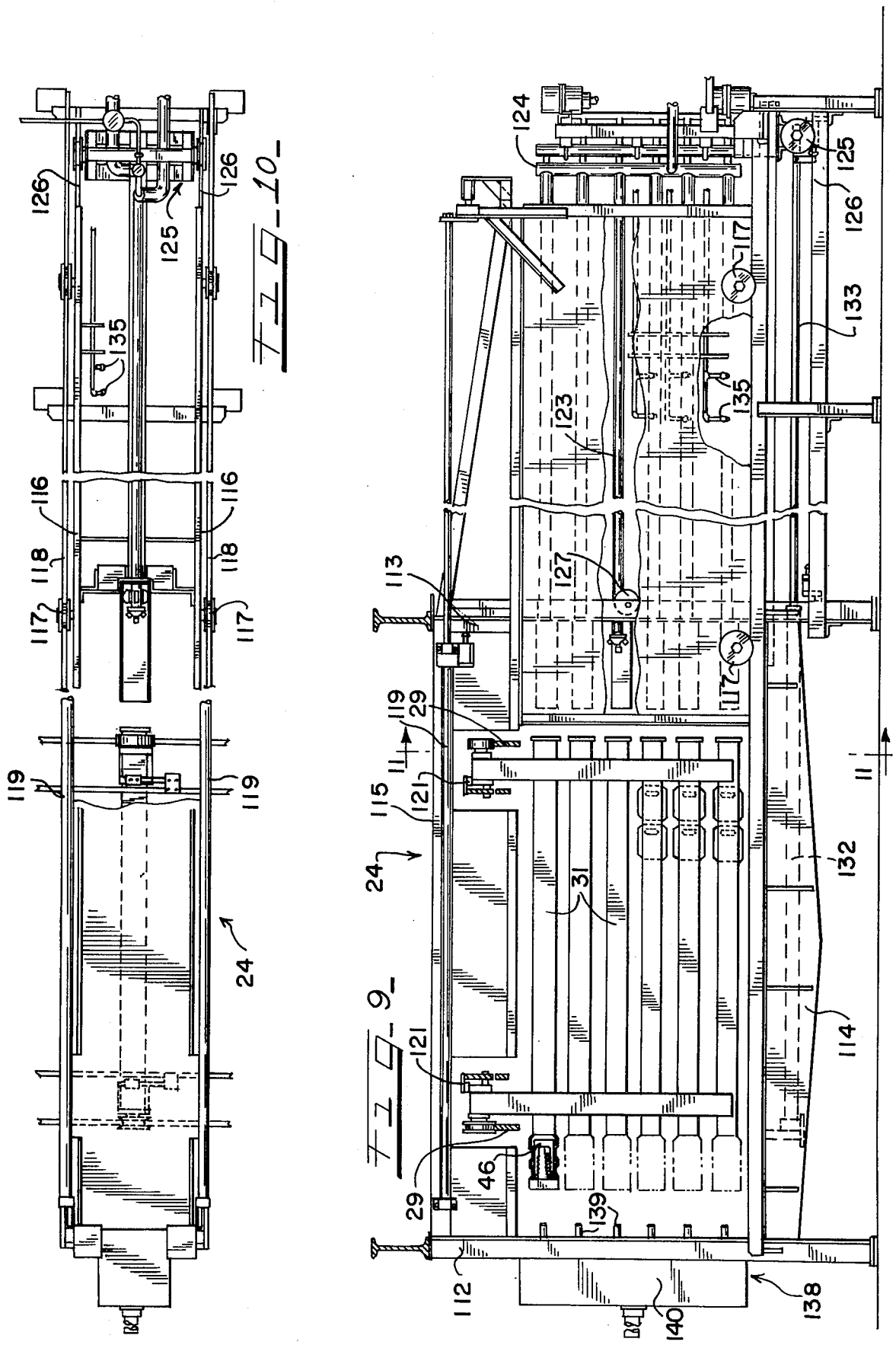

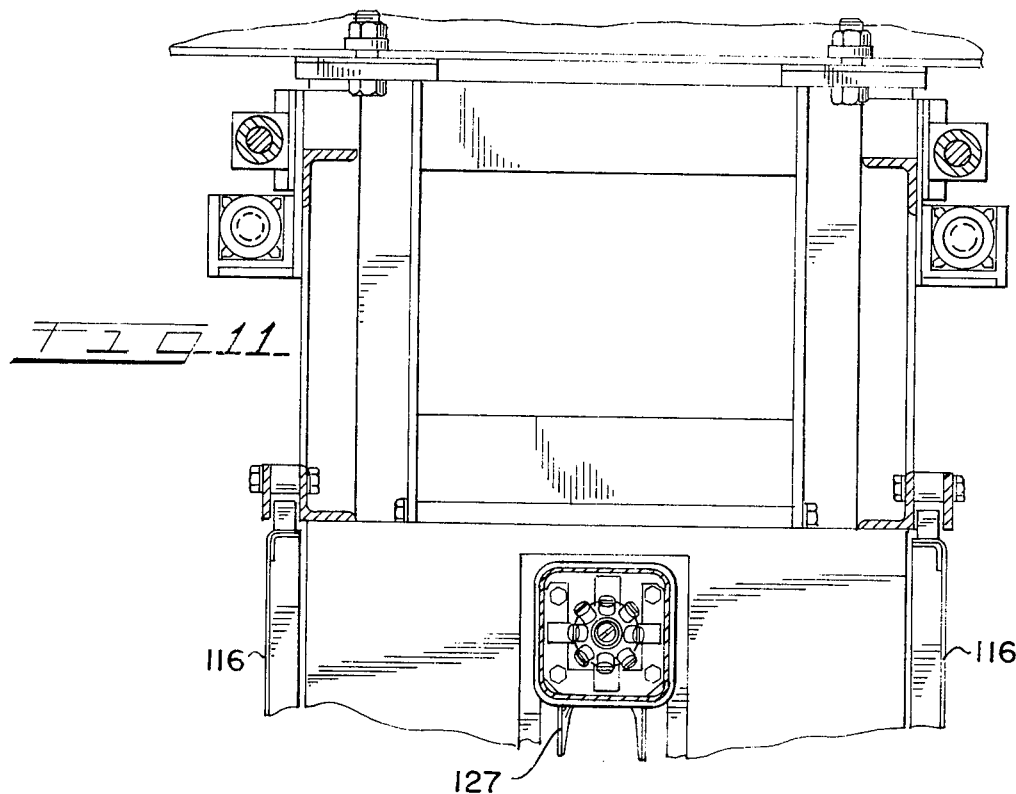
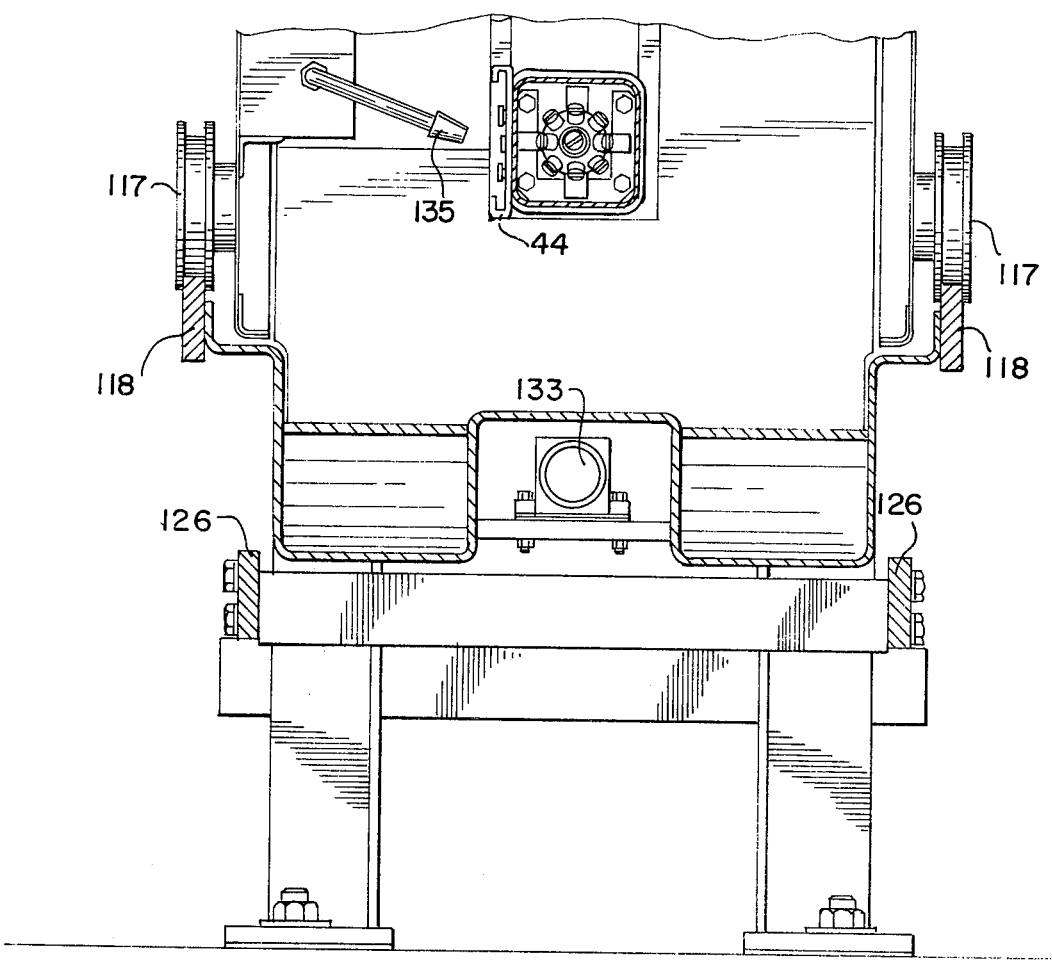

LOAF MOLD WASHING AND RELEASE AGENT APPLYING MECHANISMS

This invention relates in general to a continuous loaf processing system, and more particularly to mold washing and release agent application mechanisms for treating the surfaces of loaf molds used in the system by washing the molds following usage in the processing of a loaf food product and applying a release agent to the molds prior to filling of the molds for processing of the material in the molds.

The apparatus of the present invention is particularly useful in a method and apparatus for continuously making a loaf food product, such as a loaf meat, where a plurality of magazines of loaf molds are filled with a stuffable meat material, such as sausage batter or chunk meat, and the magazines of loaf molds are then transported through a plurality of work stations to cook and chill the meat material, remove the loaves of meat from the molds, wash the magazines of loaf molds, and apply a release agent to the loaf molds prior to again filling the molds with a stuffable meat material. Accordingly, the magazines of molds are transported through a closed loop of stations including the cook, chill, product knockout, mold wash and mold release agent application stations. Stuffing of the magazines of molds with a stuffable meat material is handled outside of the closed loop. It is therefore necessary to remove the magazine from the closed loop for the stuffing operation and then return them to the closed loop for processing. The magazines of loaf molds are wheel supported and indexed along tracks by means of an indexing conveyor that includes moving and locking bars which impart to the magazines a step-by-step movement at predetermined time intervals. Following the knockout of the loaf food product, it is necessary to wash the molds and apply a release agent prior to the next stuffing operation. Accordingly, the present invention is concerned primarily with handling a trolley support unit. However, it can be appreciated the apparatus of the present invention could be applied wherever there would be a closed loop of work stations and the need for treating the trolleyed unit with a fluid by way of spray nozzles.

The continuous loaf processing system, with which the present apparatus is primarily associated, forms no part of the present invention, but is the subject of another application owned by the assignee of this application. Further, other components of the continuous loaf processing system form the subject of other applications assigned to the assignee of this application.

The mold wash and release agent application mechanisms of the invention continuously wash magazines of loaf molds as they are indexed through the closed loop of work stations at predetermined time intervals. The washing operation is performed during the dwell time between the step-by-step movements of the magazines. The wash mechanism automatically performs the washing operation, after which the magazine is indexed into the release agent application station where the release agent application mechanism treats the molds by applying a release agent to the interior of the molds and to the covers. The mold wash and release agent application mechanisms are similar in that both do obtain fluid treatment of the molds. Application of the release agent is also automatic and precise control of the release agent is obtainable. Accordingly, automatic mechanisms are provided in the closed loop for effecting the mold wash and release agent application functions.

It is therefore an object of the present invention to provide mold wash and release agent application mechanisms in a closed loop of work stations for continuously processing a loaf food product to automatically wash the molds subsequent to product removal therefrom and to automatically apply a release agent to the molds prior to again stuffing the molds with a food material for a further processing cycle.

A further object of the present invention is in the provision of a housing defining a chamber and having doors which automatically open and close for permitting the ingress and egress of magazines of molds and mechanism for automatically applying fluid treatment to the molds in order to prepare the molds for a further stuffing operation.

Other objects, features and advantages of the invention will be apparent from the following detailed disclosure, taken in conjunction with the accompanying sheets of drawings, wherein like reference numerals refer to like parts, in which:

FIG. 1 is a side elevational view of an apparatus for carrying out the continuous processing of a loaf food product and illustrating the closed loop of work stations in which the mold wash and release agent application mechanisms of the invention are utilized;

FIG. 2 is a broken transverse view taken through the apparatus of FIG. 1 generally along line 2—2 of FIG. 1 in the mold wash mechanism to illustrate the components for the mold wash station and showing the doors of the unit in open position and some parts omitted for purposes of clarity;

FIG. 3 is a broken top plan view of the mold wash mechanism of FIG. 2 with some parts omitted and other parts shown in phantom;

FIG. 4 is a broken vertical cross-sectional view taken through the mold wash mechanism and substantially along line 4—4 of FIG. 2;

FIG. 5 is a fragmentary horizontal sectional view taken through the mold wash mechanism at the U-shaped header and showing one mold in cross section with a wand of the wash mechanism pushing a plug to the clean-up position;

FIG. 6 is an enlarged side elevational view of the ratchet take-up mechanism for a loaf mold;

FIG. 7 is an end elevational view of the ratchet take-up mechanism taken substantially along line 7—7 of FIG. 6;

FIG. 8 is a fragmentary view of the end of a mold at the ratchet take-up mechanism as would be taken generally along line 8—8 of FIG. 7 and further showing in position the ratchet release assembly which allows the plug to be pushed into the clean-up position;

FIG. 9 is a broken elevational view of the mold release agent application mechanism of the invention taken generally along line 9—9 of FIG. 1, showing the doors in open position and illustrating various components of the mechanism;

FIG. 10 is a broken top plan view of the mechanism of FIG. 9 with some parts omitted for purposes of clarity;

FIG. 11 is a broken vertical sectional view taken substantially along line 11—11 of FIG. 9;

Figure 12:
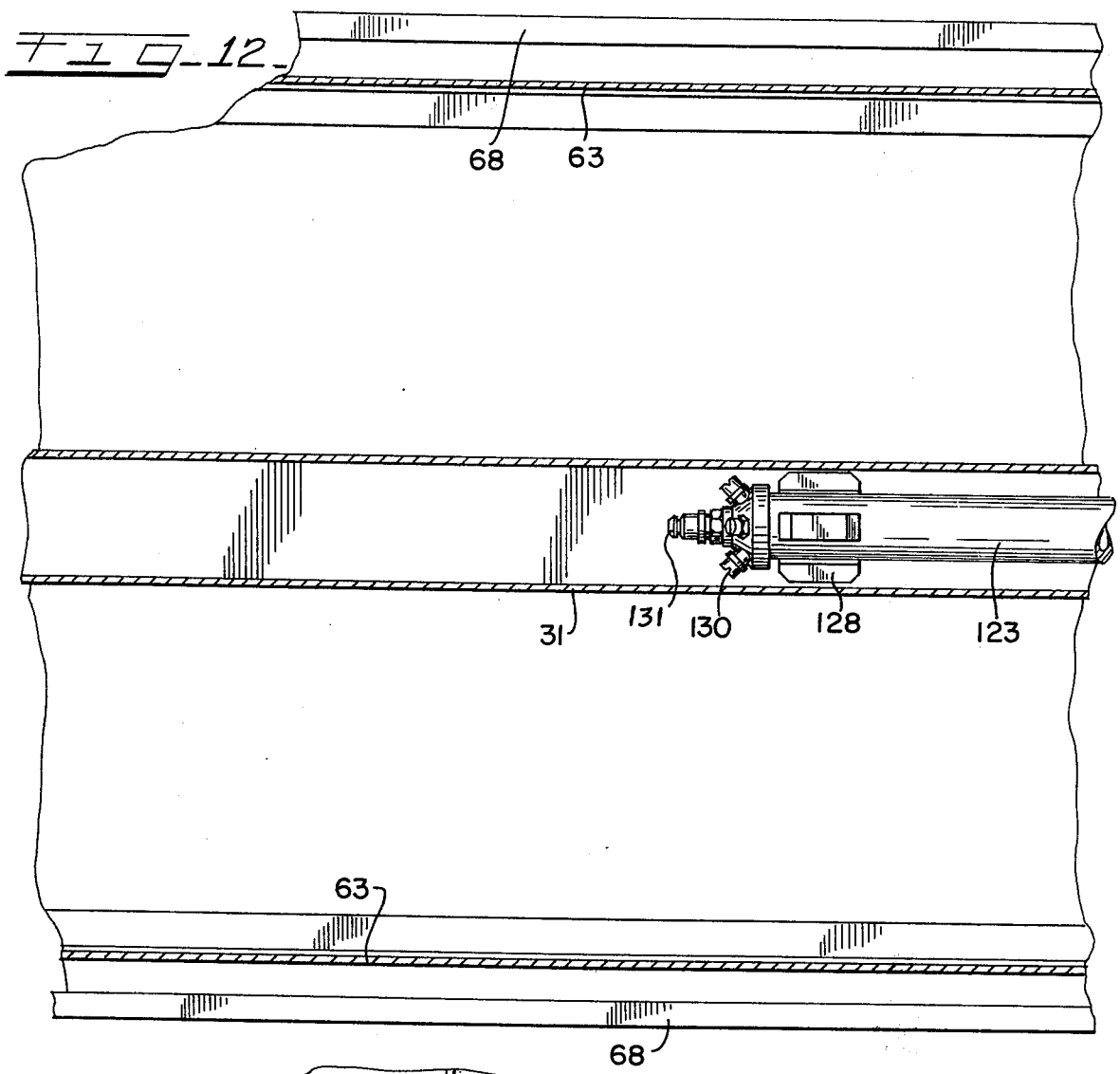
FIG. 12 is an enlarged fragmentary horizontal section taken through the release agent application mechanism and through a mold to show the nozzle wand.

Referring now to the drawings, and particularly to the overall view of the continuous loaf processing system in which the present invention is utilized, as shown in FIG. 1, it will be appreciated that magazines of loaf molds move in a step-by-step fashion through a closed loop along an upper run and along a lower run and wherein the apparatus of the present invention is utilized to remove magazines of molds from the discharge end of the lower run and reinsert them into the inlet end of the upper run. A closed loop of work stations is provided in the overall system through which magazines of loaf molds are indexed on a time cycle basis which includes a cooking station through which the magazines of molds are transported during the cooking of the food material within the molds, a chilling station for chilling the food material within the molds, a product knockout station for removal of the loaves of food product from the molds, a mold wash station for washing of the molds in preparation for a further processing cycle, and a release agent application station for applying a suitable release agent to the molds prior to again stuffing them with a stuffable food material. Between the release agent application station and the cooking station, a stuffing station is provided outside the closed loop, where the molds are stuffed with a food material to be cooked and processed when they come from the mold release agent application station and prior to being delivered to the cooking station.

As seen in FIG. 1, the work stations in the closed loop include the cook station 20, the chill station 21, the product knockout station 22, the mold wash station 23, and the release agent application station 24. A stuffing station 25 is provided outside the closed loop between the release agent application station 24 and the cooking station 20. A combination of elevators and transfer mechanisms is provided in relation to the release agent application station 24, the stuffing station 25 and the cooking station 20 for handling magazines of molds moving to the stuffing station and onto the cooking station, and is generally indicated by the numeral 26 in FIG. 1. A lowerer 27 transports magazines from the discharge end of the cook rails in the cooking station to the inlet end of the chill rails along the lower run.

A magazine of loaf molds 28 may be seen in position in the mold wash station 23, as seen in FIG. 2, supported on rails or tracks 29. The magazine of molds and the stuffing mechanism form no part of the present invention and are the subjects of separate applications owned by the assignee of this application.

The magazine of molds generally includes a plurality of horizontally extending and vertically arranged loaf molds 31 interconnected together and between vertically extending forks 32. Wheels 33 and 34 are mounted at the upper ends of the forks on the outsides thereof for coacting with tracks or rails supporting the magazines, while driving pins 35 are mounted on the inner sides of the forks at the upper ends for coacting with an indexing conveyer which includes slotted locking and moving bars 36 and 37, as seen in FIG. 2, that are suitably driven to cause a step-by-step movement to the magazines where the slots of the bars engage the driving pins. The locking bars lock the magazines in position when the moving bars are reciprocating to return to a point where they can again engage and move the magazines. This conveyor forms no part of the present invention but is the subject of a separate application owned by the assignee of this application. However, it will be appreciated that the conveyor does index the magazines along the upper run in the cooking station and along the lower run through the chill, product knockout, mold wash, and release agent application stations at predetermined timed intervals.

Inasmuch as the magazines of molds are wheel supported on rails or tracks 29, movements imparted to the magazines by the moving bars 37 between positions may cause some swaying or swinging of the magazine. It is necessary to still such swaying or swinging at both the mold wash and release agent application stations to enable performance of the necessary steps on the molds. Accordingly, an anti-sway device 40, FIGS. 2 and 3, applies a pressure to the upper ends of the forks 32 when the magazine is locked into position in a mold wash station or a release agent application station to counteract swaying or swinging. The anti-sway device is mounted on the locking bars 36 and in the form of a pad cantileverly supported from the locking bars by spring arms. Movement of the locking bars 36 into locking position relative to the driving pins 35 thereby causes engagement of the pad portions of the anti-sway devices with the upper ends of the forks 32 at a point in vertical alignment with the axis of the wheels 33 and 34.

A further understanding of the mold structure will facilitate understanding of the mold wash and release agent application mechanisms. Each mold 31 is flanged at one end, as indicated by the numeral 43 in FIG. 2, to receive a slip-on cover 44 for closing that end of the mold. Prior to product knockout, the slip-on covers are removed from the flanged ends of the molds and hung in place on the leading sides of the lower three molds, as shown particularly in FIG. 2, with the meat-engaging sides of the covers facing outwardly.

The molds are tubular and essentially square in cross section and provided at the end opposite the flanged ends with a plug and ratchet take-up assembly 45, as seen most clearly in FIGS. 6 and 7. A plastic plug 46 having a square in cross section base 47 mating with the internal cross section of a mold 31 defines a face 48 which forms an end wall for the end of the mold opposite the flanged end. A pair of ratchet legs 49 extend rearwardly of the base 47 having ratchet teeth 50 facing each other. The plug 46 is illustrated in FIG. 6 in stuff position where it is ready for the next stuffing operation. Movement of the ratchet legs 49 beyond the end of the mold 31 is guided by guide ridges 51 formed on guide bars 52 that are connected at one end to the terminal end of the mold 31 and at the other end to a generally rectangularly shaped in cross section frame 53. A pair of spring arms 54 are provided with ratchet pins 55 at the forward ends for engagement with the ratchet teeth 50 on the ratchet legs 49 and are bias supported at their rear ends by the frame 53. The rear ends of the springs 54 are connected to pivot pins 56 pivotally seated in slots 57 formed in the frame 53. Stop pins 58 lock the spring arms 54 in the slots 57 to cause the ends of the springs with the ratchet pins 55 to be biased into engagement with the ratchet teeth 50. During cooking of the meat material in the molds in the cooking station 20, expansion of the meat is compensated for by the movement of the plug 46 by the slipping of the ratchet pins 55 against the ratchet teeth 50 against the force of the spring arms 54 in order to prevent distortion of the molds. Inasmuch as shrinkage of the meat is experienced during chilling, a force is applied to the plugs to push them back into the molds as far as possible to squeeze the meat material and ultimately provide a uniformly cross-sectionally dimensioned loaf of meat. Further, the plugs are utilized for knockout of the meat product at the product knockout station 22.

Inasmuch as the plugs are positioned at the flanged ends of the molds as depicted in FIG. 2 following the knockout of the loaves of meat at the product knockout station 22, it is necessary to return the plugs to the ratchet take-up ends of the molds during the wash cycle in order to fully wash the interior surfaces of the molds. The manner in which this is accomplished will be hereinafter explained.

The mold wash mechanism of the invention is generally illustrated in FIGS. 2 to 5 and generally includes a cabinet or housing having doors which open and close to permit ingress and egress of magazines together with means for spray washing the interior and exterior of the molds and the slip-on covers. The cabinet is supported and aligned with the tracks or rails 29 so that the magazines of molds can move into and out of the station and effectively through the station for continuous automatic washing of the magazines of molds. The mold wash cabinet includes opposing end walls 60 and 61, a sump 62 arranged across the bottom for collecting water and draining to a suitable receiving unit, and opposed doors 63 and 64 slidably mounted for closing the sides of the washing chamber in which a magazine is positioned during the washing operation. A suitable top wall 65 may be provided to prevent loss of water. It will be appreciated the molds and slip-on covers, as well as the ratchet take-up mechanism, are of a suitable stainless steel. Similarly, the housing for the mold wash station is preferably of stainless steel.

The doors 63 and 64 are slidably mounted to be completely retracted to open the wash chamber so that a magazine may be moved into or out of the washing chamber, or to be completely closed over the opposite leading and trailing sides of the magazines. Each door is provided adjacent its lower edge with rollers or wheels 67 movable along tracks 68 and along their upper edges with a slide bar 69 sliding within a retaining groove 70 formed by a flange 71. The doors are driven between open and closed positions by pneumatic cylinders 72 mounted at the upper ends of the housing and having piston rods 73 connected by a bracket 74 to the end of the doors remote from the washing chamber when the doors are in open position. Opening and closing of the doors is controlled in timed relation with the movement of magazines along the stationary tracks 29 by the moving and locking bars of the conveyer. Accordingly, the doors are opened whenever the magazines are being moved in step-by-step fashion along the rails. Cushioning bumpers 75 and 76 are provided to cushion the doors 63 and 64 at the ends of the opening and closing strokes. While not shown, suitable limit switches are provided for detecting whether the doors are in fully open or fully closed positions.

The outside surfaces of the molds 31 are cleaned by traversing a U-shaped header 80 mounting a plurality of nozzles 81 along the outer surfaces of the molds. A plurality of wands 82 mounting a plurality of nozzles 83 at their forward ends clean the interior of the molds by traversing through the molds to distribute high pressure hot water. A single nozzle 84 serves to distribute a caustic or detergent solution when it is desired. Movement of the U-shaped header 80 and the wands 82 is coordinated with the time when the doors 63 and 64 are closed.

The U-shaped header 80, as seen particularly in FIGS. 3, 4 and 5, is mounted for reciprocation along the magazine of molds by a wheeled carriage 85 movable along tracks 86. The carriage 85 includes a frame 87 having wheels or rollers 88 mounted at opposite ends and is provided with suitable connection to the U-shaped header. The carriage is connected to one end of a beam 89, as seen in FIG. 2, which is connected at its other end to a similar wheeled carriage 90 movable along tracks 91 and supporting a header pipe 92 connected to the rear ends of each of the wands 82. The header pipe is in turn connected to a suitable source of water through suitable plumbing, including control valves. Likewise, the U-shaped header 80 is suitably connected to plumbing and control valves, all of which are connected to a pressurized water supply. Accordingly, the U-shaped header 80 and the wands 82 are interconnected for movement together during traverse of the wash chamber and the washing of the molds.

The wands 82 are also supported by guide rollers 95 adjacent their forward end when the wands are in retracted position, as shown in FIG. 2. Centering guides 96 in the form of nylon blocks are mounted adjacent the heads of the wands for coaction with the interior of the molds 31 to centrally position the nozzles within the molds during the time the wands traverse the interior of the molds and to support the ends of the wands. Further, the heads of the wands are provided with an axially mounted pusher 97 for engagement with the face 48 of a plug 46 to drive the plug back to the ratchet end of the mold and into a clean-up position where the face 48 of the plug is spaced beyond the end of the mold, as shown in FIG. 8.

In order to permit the plug to be moved to its clean-up position, it is necessary to position the ratchet pins 55 away from engagement with the ratchet teeth 50 on the ratchet legs 49. Accordingly, a ratchet spring release assembly 100 is actuated at the mold wash station to engage the ratchet pins 55 and force them together and away from any possible engagement with the ratchet teeth on the plugs 46. The ratchet spring release assembly 100 includes a bifurcated head 101 mounted on a bar 102. The head 101 includes a pair of arms 103, only one of which is shown in FIG. 8, for movement along opposite sides of the frame 53 and engagement of the opposite ends of the pins 55. The ends of the arms 103 are provided with U-shaped slots 104 that engage and cam inwardly the ratchet pins 55 against the biasing force of the ratchet springs 54 to a position like that shown in FIG. 8 which allows movement of the plugs 46 to the clean-up position. Once the plugs 46 have been moved to clean-up position, the ratchet spring release assemblies 100 are retracted. Any suitable drive means may be provided for reciprocating the ratchet spring release assemblies 100 into and out of position relative to the ratchet take-up assemblies of the molds, and such is illustrated generally in box form by the numeral 105 in FIG. 2.

The U-shaped header 80 and the wands 82 are reciprocated relative the molds by means of a hydraulic cylinder 108 mounted below the wash chamber and having a piston rod 109 connecting to the wheeled carriage 90. During the first pass of the U-shaped header and the wands relative the molds, the plugs are pushed to clean-up position, and the exterior of the molds and slip-on covers are washed by the U-shaped header 80. It will be appreciated here that a suitable cleaning water is therefore only distributed through the U-shaped header during the initial pass which moves the header and wands into the wash chamber. On the return stroke of the first pass, the header continues to distribute water through the header, cleaning the exterior of the molds. During the second pass, water is directed only through the wands to clean the interior of the molds. The wash cycle may be programmed to provide whatever cleaning is believed necessary. For example, a hot high-pressure water is normally issued from the wands and the header. However, a caustic solution may be applied to the magazine and later rinsed off by hot water. When a caustic is used, hot water may be directed to the U-shaped header and the wands at the same time for rinsing the caustic from the magazine and covers. During rinsing, the wands and U-shaped header are both extended through a forward stroke and retracted through a return stroke. The time of traverse of the header and wands may be controlled by suitable timing mechanisms in accordance with the amount of cleaning needed. After the cleaning cycle has been completed, the doors 63 and 64 open in time for the next step movement of the magazines along the rails 29. Accordingly, as the magazines move through the mold wash station 23, the molds are washed and prepared for the release agent application station 24.

It may be further appreciated that the temperature of the hot water spray and the pressure of the hot water spray may be varied in accordance with the desired needs. Further, the speed of the wands and U-shaped header can be varied by regulation of the hydraulic fluid to the driving cylinder 108. All variables hinge on obtaining adequate cleaning of the loaf molds.

The mechanism at the mold release agent application station 24 is generally similar to the mechanism of the mold wash station 23 in that it includes a housing defining a treatment chamber through which the magazines of molds are moved in step-by-step fashion. At this station, the main objective is to apply a coating of a suitable release agent to the interior of each mold, as well as the plug face and the underside of each slip-on cover. Prior to stuffing the molds with a suitable meat material, it will be appreciated the release agent enhances the removal of the loaf food product from the molds at the product knockout station 22.

While any suitable release agent may be used, it is preferable that the release agent be liquid at room temperature. One that is satisfactory is a mixture of soybean oil and Lecithin, where the mixture includes by weight 85 to 90 percent soybean oil and 10 to 15 percent Lecithin.

As illustrated in FIG. 9, the plugs 46 are at the ratchet end of the molds in the clean-up positions during application of the release agent. Just prior to the completion of the timed interval for treating a magazine within the release agent application station, the plugs are pushed to the stuff position, as illustrated in FIG. 6. The magazine of molds is then ready to be advanced out of the release agent application station to be transferred to the stuffing station for a stuffing operation.

The treatment housing at the release agent application station is identical to that at the wash station in that it includes opposed end walls 112 and 113, a sump 114 forming a bottom wall for collection of release agent which does not adhere to the molds or covers, a top wall 115, and a pair of sliding side doors 116.

The side doors 116 are provided with wheels or rollers 117 riding on tracks 118 and are driven by pneumatic cylinders 119. The doors are selectively opened and closed to permit ingress and egress of the magazines in timed relation with the time intervals for stepping a magazine along the tracks 29. Magazine anti-sway devices 121 are also provided at the release agent application station for countering sway of a magazine as it is moved into position at the station.

Figure 13:
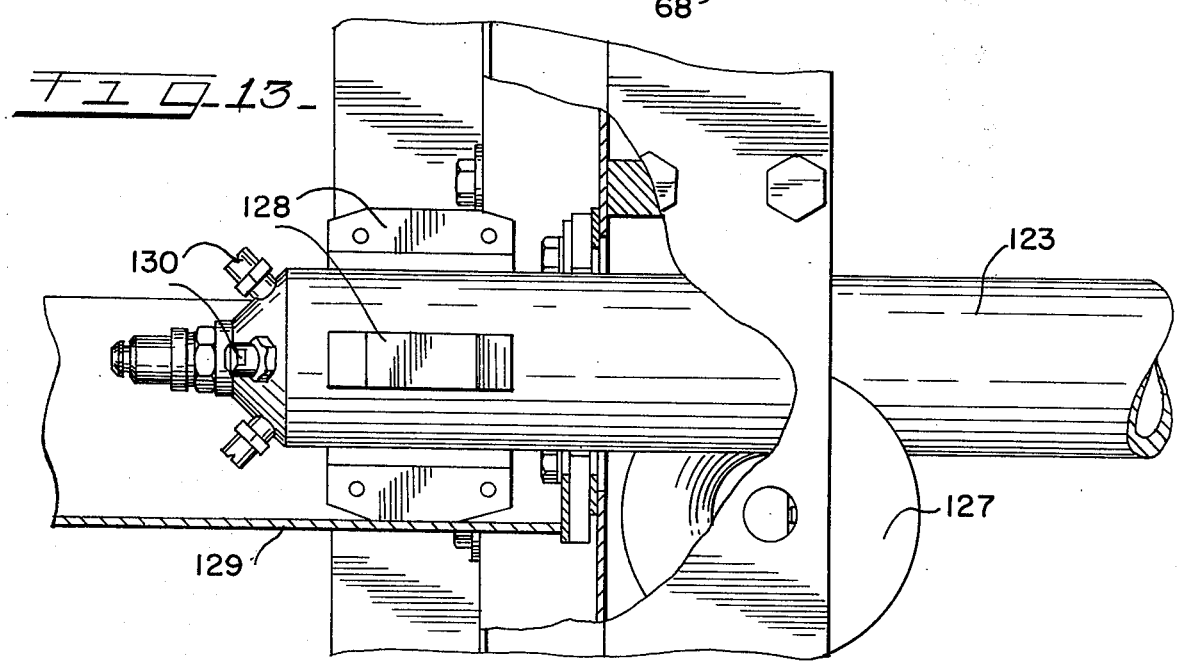
FIG. 13 is an enlarged fragmentary sectional view of a nozzle wand looking at the wand in side elevation.

A wand assembly is provided which includes a plurality of wands 123, one for each mold, that is similar to the wand assembly at the mold wash station for applying a release agent to the interior of each mold. The wands are connected at their rear ends to a header 124 mounted on a wheeled carriage 125 movable along tracks 126. At the forward ends of the wands when they are in their return position, as shown in FIG. 9, they are supported by guide rollers 127. Further, as seen in FIG. 13, the horizontally opposed and lowermost centering guides 128 on the forward ends of the wands are guidably received in a trough 129 in alignment with a mold. Air blow-off nozzles 130 mounted on the ends of the wands 123 remove excess water from the molds prior to application of the release agent. A nozzle 131 is mounted on the end of the wand and distributes an air atomized release agent.

As in the mold wash station, a hydraulic cylinder 132 having a piston rod 133 connected to the carriage 125 drives the wand assembly through its forward and return strokes during the release agent application cycle.

In order to apply a release agent to the slip-on covers 44 mounted on the lead side of the lower three molds of each magazine, a series of six nozzles 135 are mounted on the door 116 which faces the leading side of the magazine of molds.

During the entire cycle of operation at the release agent application station, water is blown from the interior of the molds and from the covers to effect a drying action. A release agent is applied to the interior of the molds, the plug and the undersides of the covers, and the plug is reset to the stuff position. Following the positioning of a magazine of molds within the release agent application station chamber, the doors 116 close. Thereafter, the wand assembly is driven where the wands are traversed through the molds. Depending on the program selection for washing the magazines in the mold washing station, the first forward stroke of the release agent wands may or may not be used for fresh water rinsing of the mold interiors via the air blow-off nozzles. If a fresh water rinse is programmed, the exterior surfaces are rinsed at the same time from fixed nozzles mounted in the release station housing. On the first return stroke, air is applied to the release agent wands. This serves to clear all water from the air blow-off passages of the wands. On the second forward stroke, the air blow-off purges the water from the mold interiors. On the second return stroke, release agent is applied to the plug faces and interior surfaces of the molds through the atomizing release agent spray nozzles. Simultaneously, a release agent is applied through cover nozzles 135 to the undersides of covers 44. Thereafter, the plugs 46 are reset to the stuff position by actuation of the resetting mechanism 138, which includes a plurality of reset rods 139 operated by an actuator 140. Following reset of the plugs and timing out of the release agent application cycle, the doors 116 open to permit the magazine to be stepped onto the next position beyond the release agent application station.

It will be appreciated that suitable limit switches will be utilized in both the mold wash and release agent application stations to detect the positions of the doors, the wand assemblies, the ratchet spring release assembly, and the plug resetting mechanism. Necessary control components and instrumentation will also be provided. The speed at which the wand assemblies are driven can be varied, together with the hot water pressure in the wash station, the air and release agent pressure in the release agent application station. While it is necessary to obtain proper washing in the mold wash station, it is also necessary to obtain full coverage of the loaf molds and covers with an adequate amount of release agent in the release agent application station.

It will be understood that modifications and variations may be effected without departing from the scope of the novel concepts of the present invention, but it is understood that this application is to be limited only by the scope of the appended claims.

The invention is hereby claimed as follows:

1. In a continuous loaf processing system for producing a molded loaf food product from a stuffable raw food material including a plurality of wheel supported magazines of tubular loaf molds being driven step-by-step at predetermined time intervals along tracks through a closed loop of work stations, each magazine of molds having a plurality of interconnected vertically aligned and horizontally extending molds, each mold having a plug at one end movably positionable within the mold and a removable cover for the other end, said plug coacting with a ratchet take-up device for regulating expansion and contraction of the food material during processing, means on the molds for hanging the removable covers, and wheels connected to the molds for movably supporting the magazine on rails for movement thereof along a path transverse the longitudinal axis of the molds, mechanism for treating said magazines preparatory to stuffing comprising: a housing into which a magazine of molds is driven for treatment and out of which it is driven following a treatment cycle and which includes a treatment chamber, doors for the chamber, means driving the doors between open and closed positions during ingress and egress of a magazine, a wand assembly having a plurality of wands with spray nozzles, one wand for each mold, means mounting the wand assembly for movement to cause the wand spray nozzles to traverse the interior of the molds, and means supplying a treatment material to the nozzles for treating the insides of the molds.

2. The treating mechanism defined in claim 1, wherein said means supplying a treatment material includes a source of high pressure hot water for effecting cleaning of the molds.

3. The treating mechanism defined in claim 1, wherein said means supplying a treatment material includes a source of medium pressure liquid release agent for coating the molds prior to stuffing thereof.

4. The treating mechanism defined in claim 1, which further includes a U-shaped header for traversing the exterior of the molds, spray nozzles mounted on the header, said means supplying a treatment material including a source of high pressure hot water for the nozzles of the wands and the nozzles of the header for effecting cleaning of the exterior and interior of the molds.

5. The treating mechanism defined in claim 4, which further includes means on the wands for positioning the plugs at a clean-up position during cleaning of the molds, and means for deactuating the ratchet take-up device.

6. The treating mechanism defined in claim 3, which further includes spray nozzles on one door for applying a release agent to the covers hanging on the molds.

7. The treatment device defined in claim 6, which further includes means for resetting the plugs to a stuff position.

8. The treatment device defined in claim 1, which further includes means for countering sway of the magazine prior to driving the wands into the molds.

9. The treatment device defined in claim 1, which further includes means detecting the open and closed positions of the doors and the return position of the wands.

10. The treatment device defined in claim 1, wherein said means driving the doors includes pneumatic cylinders.

11. The treatment device defined in claim 4, wherein said U-shaped header is connected to said wand assembly for simultaneous movement therewith.

12. In a continuous loaf processing system for producing a molded loaf food product from a stuffable raw food material including a plurality of wheel supported magazines of tubular loaf molds being driven step-by-step at predetermined time intervals along tracks through a closed loop of work stations, each magazine of molds having a plurality of interconnected vertically aligned and horizontally extending molds, each mold having a plug at one end movably positionable within the mold and a removable cover for the other end, said plug coacting with a ratchet take-up device for regulating expansion and contraction of the food material during processing, means on the molds for hanging the removable covers, and wheels connected to the molds for movably supporting the magazine on rails for movement thereof along a path transverse the longitudinal axis of the molds, mechanism for treating said magazines preparatory to stuffing comprising: first and second housings into which a magazine of molds is driven for treatment and out of which it is driven following a treatment cycle, each housing including a treatment chamber, doors for the chamber, means driving the doors between open and closed positions during ingress and egress of a magazine, a wand assembly having a plurality of wands with spray nozzles, one wand for each mold, means mounting the wand assembly for movement to cause the wand spray nozzles to traverse the interior of the molds, and means supplying a treatment material to the nozzles for treating the insides of the molds, wherein said first housing further includes a U-shaped header for traversing the exterior of the molds, spray nozzles mounted on the header, said means supplying a treatment material including a source of high pressure hot water for the nozzles of the wands and the nozzles of the header for effecting cleaning of the exterior and interior of the molds, and wherein said means supplying a treatment material in said second housing includes a source of medium pressure liquid release agent for coating the molds prior to stuffing thereof.

13. In a continuous loaf processing system for producing a molded loaf food product from a stuffable raw food material including a plurality of wheel supported magazines of tubular loaf molds being driven step-bystep at predetermined time intervals along tracks through a closed loop of work stations, each magazine of molds having a plurality of interconnected vertically aligned and horizontally extending molds, each mold having a plug at one end movably positionable within the mold and a removable cover for the other end, said plug coacting with a ratchet take-up device for regulating expansion and contraction of the food material during processing, means on the molds for hanging the removable covers, and wheels connected to the molds for movably supporting the magazine on rails for movement thereof along a path transverse the longitudinal axis of the molds, mechanism for treating said magazines preparatory to stuffing comprising: a housing through which the magazines are driven defining a treatment chamber, said housing having doors, means selectively driving the doors between open and closed positions to permit ingress and egress of magazines of molds and treatment of the magazines of molds, a wand assembly having a plurality of wands with fluid spray nozzles for entering the molds to apply fluid treatment to the molds, and means for driving the wand assembly to cause the wands to traverse through forward and return strokes through the molds.

* * * * *